Sept. 12, 1950 V. M. THEIS 2,522,202
TABLE WITH MECHANISM WHEREBY ITS TOP MAY
BE INCREASED OR DECREASED
Filed Sept. 28, 1946 6 Sheets-Sheet 1

INVENTOR.
Victor M. Theis
By: Fred Gerlach
atty.

INVENTOR:-
Victor M. Theis
By: Fred Gerlach
Atty.

Sept. 12, 1950 V. M. THEIS 2,522,202

TABLE WITH MECHANISM WHEREBY ITS TOP MAY BE INCREASED OR DECREASED

Filed Sept. 28, 1946 6 Sheets-Sheet 3

INVENTOR.

Victor M. Theis.

By: Fred Gerlach atty.

INVENTOR:
Victor M. Theis
By: Fred Gerlach
Atty.

INVENTOR.
Victor M. Theis
By: Fred Gerlach
atty

Sept. 12, 1950 V. M. THEIS 2,522,202

TABLE WITH MECHANISM WHEREBY ITS TOP MAY BE INCREASED OR DECREASED

Filed Sept. 28, 1946 6 Sheets-Sheet 6

INVENTOR.
Victor M. Theis

By:- Fred Gerlach atty:-

Patented Sept. 12, 1950

2,522,202

UNITED STATES PATENT OFFICE 2,522,202

TABLE WITH MECHANISM WHEREBY ITS TOP MAY BE INCREASED OR DECREASED

Victor M. Theis, Chicago, Ill.

Application September 28, 1946, Serial No. 700,083

4 Claims. (Cl. 311—41)

This invention relates, in general, to tables, and more specifically to that type of table which may be converted to adapt it to various uses, such as a common table or a game table.

One object of the invention is to provide in a table of this character, means such as slides, extensions or supports that are adapted to be drawn out or extended with respect to the table, to hold beverage glasses or other objects, so that they will not form an obstruction to the table top, and which supports are adapted, when not to be used, to be withdrawn, or slid into the table, or beneath the top thereof.

A further object is to provide an improved table of this character, which is also provided with supports or extensions adapted to be projected beyond the table top, to receive and hold or store game pieces, so that the table top will be free from such stored pieces, and said supports or extensions, when not in use, being adapted to be retracted or moved back beneath the table top.

A still further object is to provide in a table of this character, improved means for simultaneously projecting and withdrawing the said supports or extensions with respect to the table top.

Still another object is to provide an improved table of this character, which is of a simple, durable and compact construction, and is effective and efficient in operation.

To the attainment of these ends and the accomplishment of other new and useful objects as will appear, the invention consists in the features of novelty in substantially the construction, combination and arrangement of the several parts, hereinafter more fully described and claimed, and shown in the accompanying drawings exemplifying this invention, in which Fig. 1 is a plan view of a table embodying this invention;

Figures 1, 2, 3, 4:
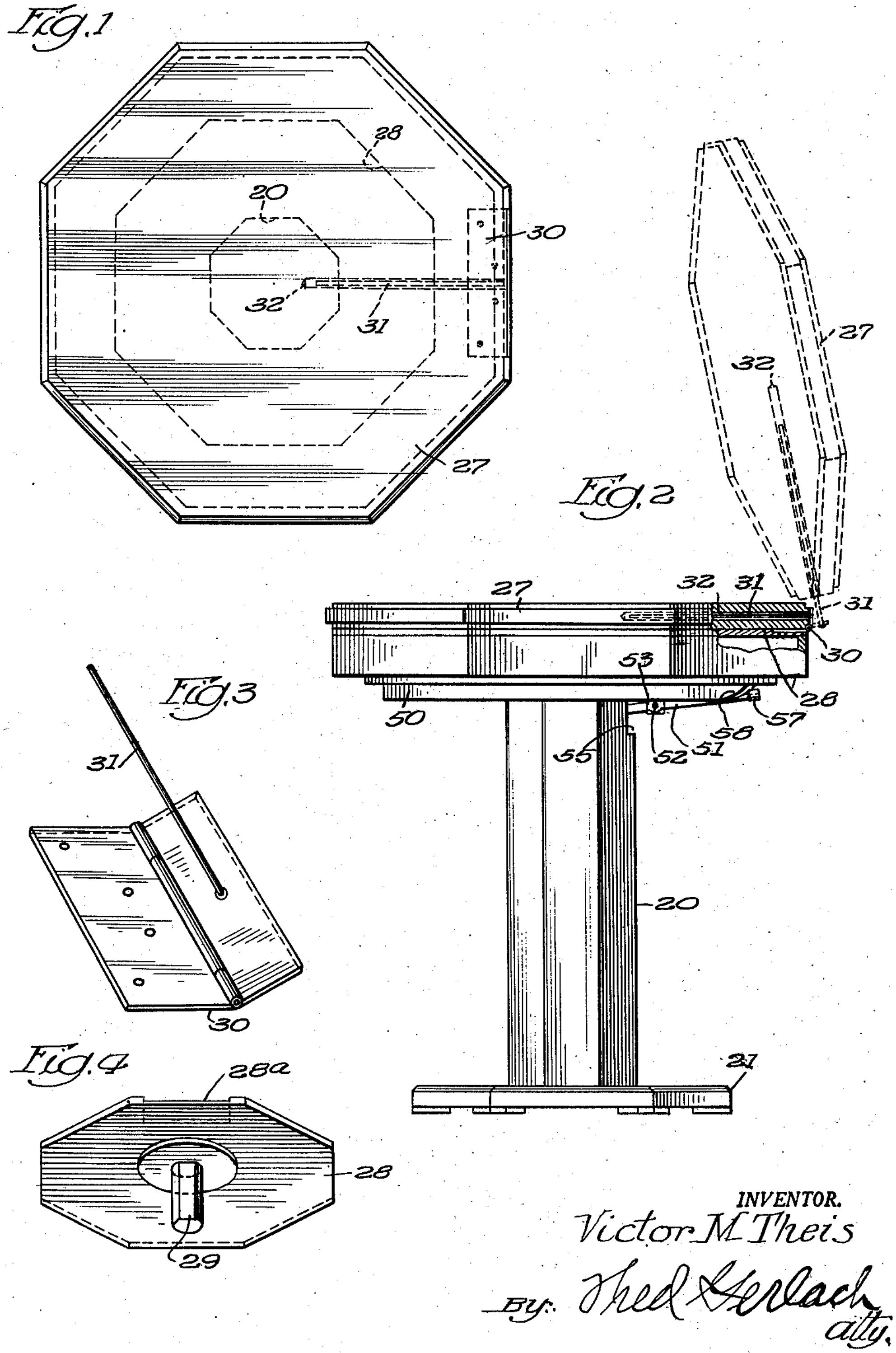
Fig. 2 is a side elevation showing, in dotted line, the table top raised to a position wherein it may be inverted.
Fig. 3 is a detail perspective view of the hinge and pivot for the top.
Fig. 4 is a detail perspective view from the bottom of the supporting and guiding plate or member for the table top.

The table consists essentially of a standard 20, of any desired height and configuration, and this is provided at its lower end with a suitable supporting base 21. The upper part of the standard is preferably hollow, and mounted at the top thereof is a supporting plate 22 (Figs. 5-6-7), which is also of any desired size and configuration. Mounted upon the plate 22 is an actuating member 23, hereinafter more fully described, for controlling and actuating the hereinafter described slides or extensions. A guide plate 24 is disposed above, and in close proximity to, the actuating member 23, and those parts are held together by means of a bushing 25 which is provided at the upper end thereof with a flange 26. The body of the bushing passes through the guide plate 24, the supporting plate 22, and into the top of the standard 20.

A table top 27 is supported by means of a plate 28 which is provided with a centrally disposed, downwardly projecting stud 29. The latter passes through the bushing 25, the plate 22, and into the standard 20, in such a manner that the plate 28 may be raised and lowered with respect to the standard.

The table top 27 and the plate 28 may be of any desired configuration, but are preferably shaped to conform to the contour of each other. The top is connected to the plate 28 so that it will have a hinge or swinging action with respect thereto, to raise and lower the same, and also have a swivel or pivotal action, whereby the top, when raised, may be inverted, so that when lowered into operative position, the predetermined side or face of the top will be uppermost. To that end, there is provided a hinge element 30, one leaf of which is secured to the plate 28 (Fig. 2), preferably by being recessed thereinto (as at 28*a*). The other lead of the hinge element is connected to the table top by means of a rod 31, which telescopes into an elongated hole 32, extending into the table top through the edge thereof. When the top is raised as shown in dotted lines in Fig. 2, it may then be swung or pivoted about the rod 31 to invert it, after which it may be lowered to normal position for use. If desired, one face of the table top may be provided with a covering 33, such as felt or the like.

Slidably mounted upon the guide plate 24, are a plurality of slides 34, each of which is provided with a body portion that fits and moves in a slot 35 that is undercut, as at 36, to receive side flanges 37 on the body portion. The slots 35 radiate from, and terminate short of, the center of the plate, and any number of such slots may be provided, according to the number of slides 34. The body portions of the slides are also provided with transversely extending grooves 38, opening through the sides thereof, and the top parts are shaped to form steps 39 and 40, for a purpose to be described.

Figures 10, 11, 12, 13:
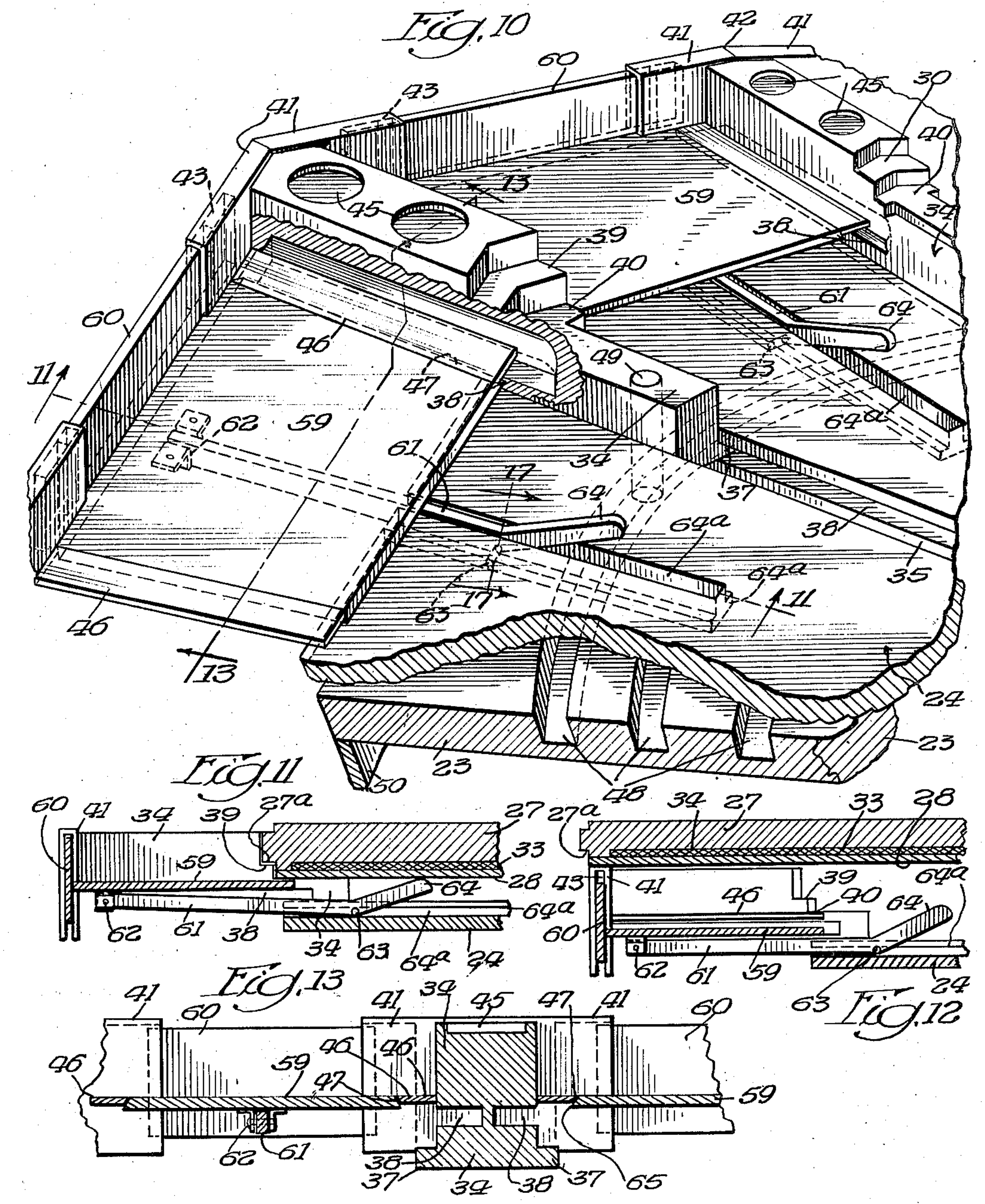
Fig. 10 is a detail perspective view, on an enlarged scale, with parts broken away for clearness, and with the slides or supports extended with respect to the table top.
Fig. 11 is a sectional view on line 11—11, Fig. 10, on a smaller scale.
Fig. 12 is a view similar to Fig. 11, showing the slide or support retracted.
Fig. 13 is a sectional view on line 13—13, Fig. 10, on a smaller scale and with certain of the slides extended, and the slides raised.
Figure 14:
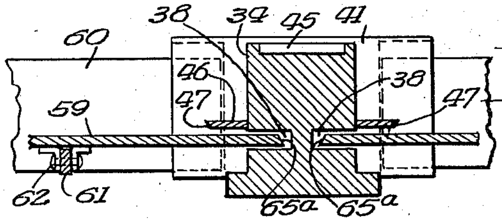
Fig. 14 is a view similar to Fig. 13, showing certain of the slides lowered and retracted.
Figure 15:
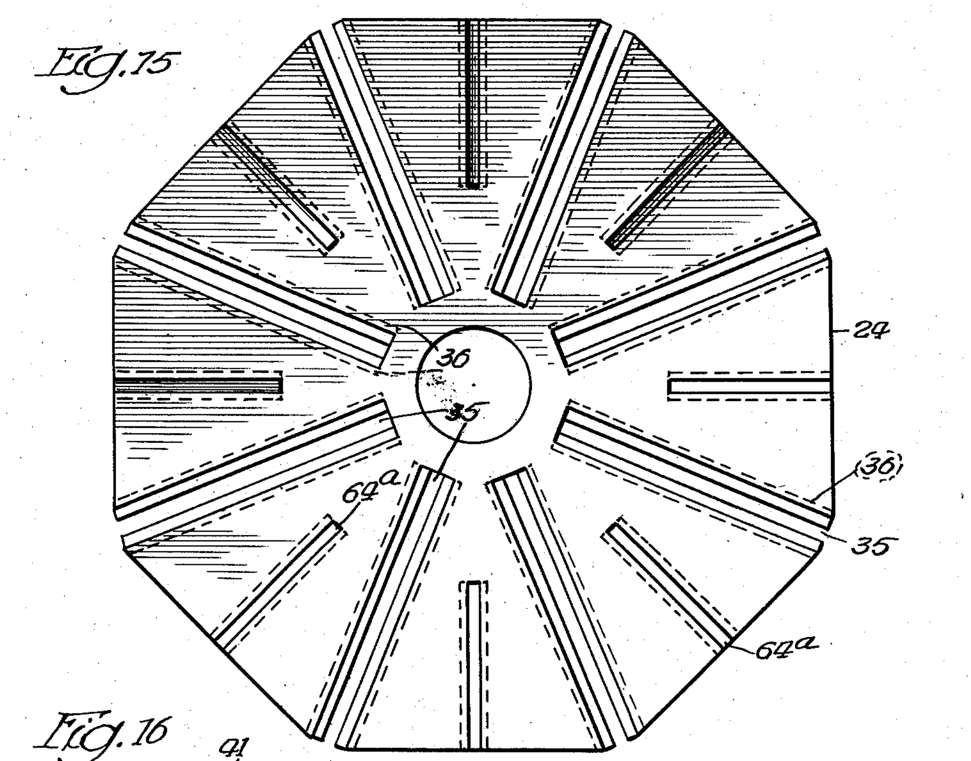
Fig. 15 is a top plan view of the member for guiding the slides into extended and retracted positions.
Figures 16, 17, 18:
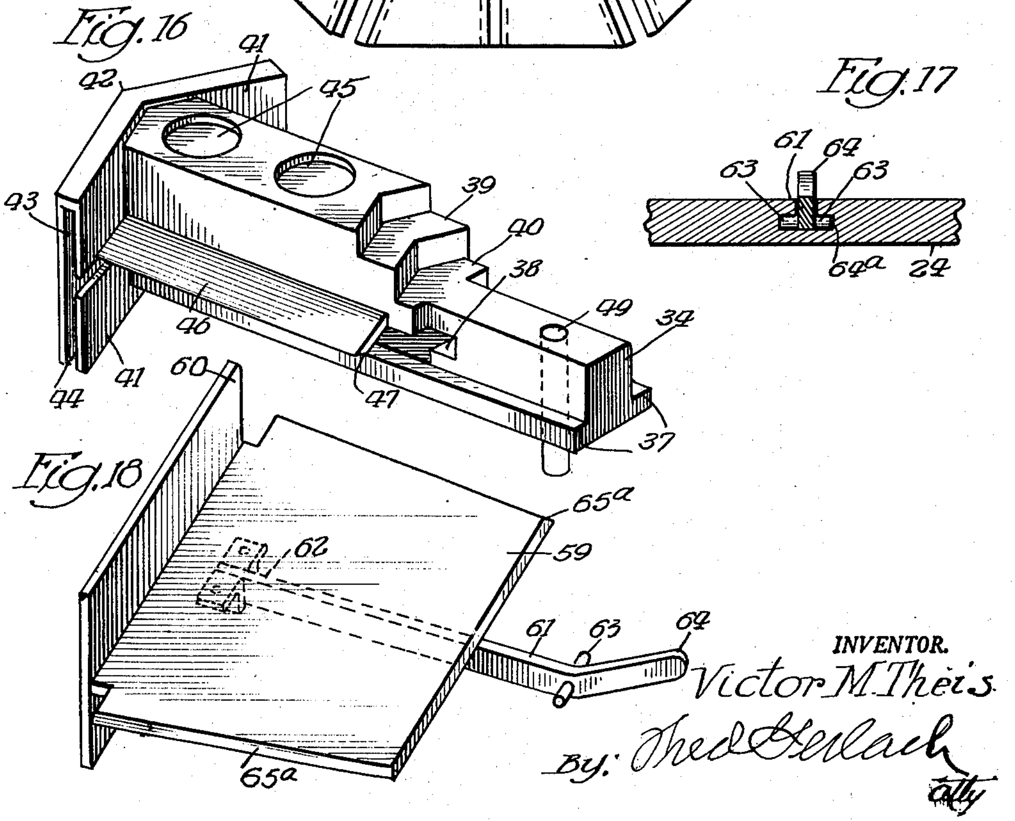
Fig. 16 is a detail perspective view of one of the slides or supports.
Fig. 17 is a detail sectional view on line 17—17, Fig. 10.
Fig. 18 is a detail perspective view of another of the supports or slides, and the means for raising and lowering the same.
Figure 19:
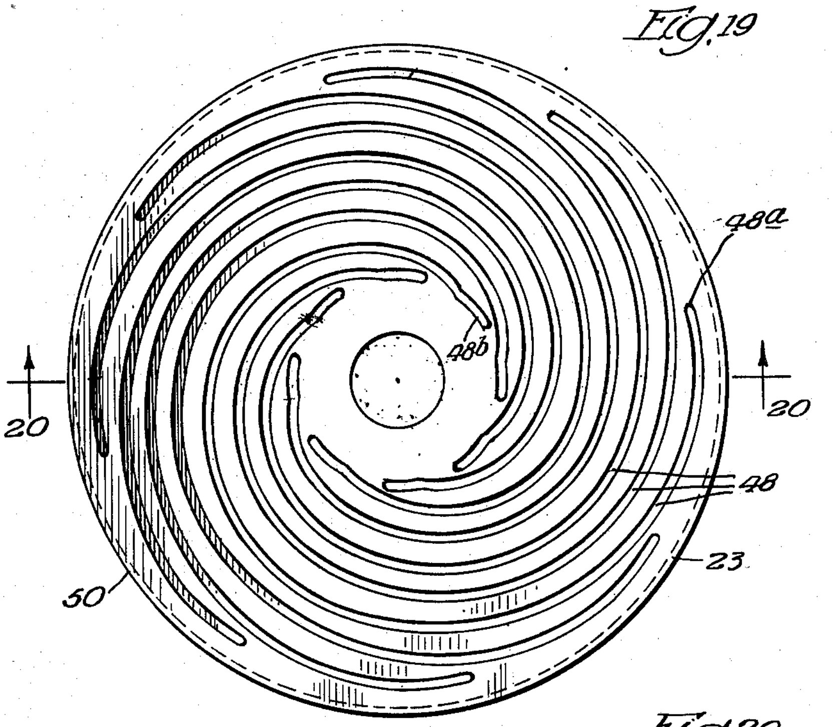
Fig. 19 is a plan view of the actuating member showing the spiral grooves in the top thereof.
Figure 20:
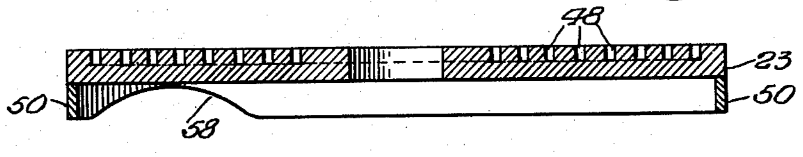
Fig. 20 is a transverse section of the actuating member taken on the line 20—20 of Fig. 19.
Figure 21:
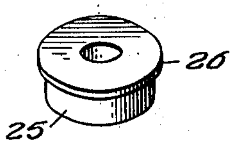
Figs. 21, 22 and 23 are perspective views of certain operating parts of the table.
Figures 22, 23:
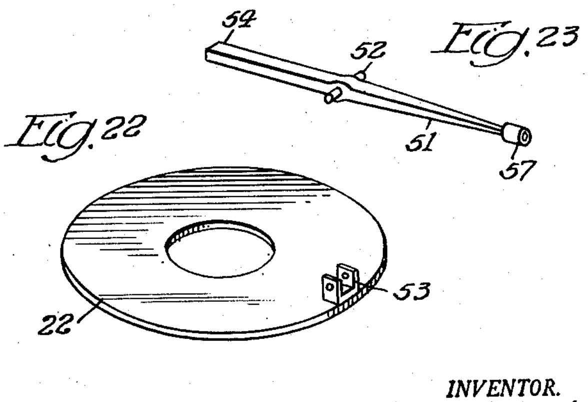

At the outer end of the body portion slide 34 is an upright wall 41, the end portions of which project laterally and are inclined or angularly disposed with respect to each other from a medial point 42. Each wall is hollow at its ends, as at 43, and open at the bottom, as at 44. Article receiving recesses 45 are formed in the top parts of the body portions of the sides and laterally projecting flanges 46 project from the sides of the body portions above and in proximity to the grooves 38, the outer edges of the flanges preferably being beveled, as at 47 (Figs. 13 and 14).

The slides 34 are adapted to be projected with respect to the table top, and to be withdrawn, by the actuating member 23. To that end, this actuating member is provided with a series of spirally arranged grooves 48, any number of which may be provided, one for each slide, and they open through the top of the member, and respectively receive pins or projections 49. The latter are secured to and depend from the slides. The inner end portions 48*a*, and the outer ends 48*b*, of the spirals are concentric with the center of the actuating member 23, for a purpose to be described.

The actuating member may be provided with a depending circumferential flange 50, by means of which it may be rotated about the pivot formed by the bushing 25, and, when rotated, the pins 49, riding in the grooves 48, will cause the slides 34 to move outwardly or inwardly in the slots 35, according to the direction of rotation of the actuating member.

The tops of the outer portions of the slides 34, when the latter are in extended position, are substantially flush with the top of the table when the latter is in normal operative position, but the slides are adapted to be moved under or beneath the table top when not in use. To accomplish these ends, the table top is adapted to be bodily raised and lowered, and this is accomplished in any suitable manner, preferably by means of a lever 51 that is pivotally connected intermediate its ends, as at 52, to ears or brackets 53, on the supporting plate 22. The lever is of a length that one end 54 will project into the standard 20, through an opening 55 therein, to engage a reduced end 56 of the stud 29 of the plate 28. At the other end of the lever there is provided a roller 57 that contacts the lower edge of the flange 50 on the actuating member 23. This flange is provided with a cam surface or recessed portion 58, to receive the roller 57 (Figs. 5 and 7), when the actuating member 23 has been moved to a predetermined position.

The operation of this part of the table is as follows: In normal position, the slides 34 are disposed beneath the table top, and the table top is in a lowered position for use (Fig. 5), and the cam or recessed portion 58 of the flange 50, on the actuating member 23, is in a position to receive the roller 57 on the outer end of the lever 51.

By rotating the actuating member 23, the cam surface or wall of the recess 58 will operate upon the roller end of the lever 51, to depress it and raise the end 54, causing the latter to force upwardly the plate 28 and the table top 27. Continued rotation of the actuating member will hold the table top elevated until the cam or recess 58 assumes a position to again receive the roller end of the lever 51, at which time the table top will drop back into normal or operative position. During the interval that the table top is thus held elevated, the slides or extensions 34 will be actuated by reason of the pins 49, traveling in the spiral portions of the grooves 48 in the actuating member.

In order to permit the table top to be raised to a position to permit the slides or extensions 34 to be projected, and before the slides begin to be moved by the actuating member 23, the inner end portions 48*a* of the grooves in the actuating member are concentrically disposed with respect to the center of rotation of the member. The extent of such concentricity is such that there will be no binding or interference between the parts. As soon as the top has been shifted upwards the spiral portions of the grooves will begin to operate upon the pins 49. Likewise, the outer portions 48*b* of the grooves 48 are concentrically diposed with respect to the center of rotation of the actuating member 23, so that when it is desired to slide inwards the slides 34, the slides will be stationary during the first portion of rotation of the actuating member 23. In connection with initial turning of the member 23 the flange 50 will depress the roller 57 on the outer end of the lever 51 and effect raising of the top. As soon as the top has been thus elevated, the pins 49 on the slides will enter the spiral portions of the grooves 48.

The slides will continue to be moved by the spiral portions of the grooves until the recess 58 in the flange 50 assumes a position to receive the roller 57, at which time the table top will drop. This raising and lowering of the table top will take place when the slides are fully extended or withdrawn.

The slides 34 are laterally spaced from each other, and additional slides 59 are disposed between adjacent slides 34. These additional slides each embody a body portion, preferably in the form of a shelf having an upright wall 60 at the outer end thereof. Each of the slides 59 is supported by means of a radially extending lever 61, the outer end of which is pivotally connected, as at 62, to the bottom of the slide. A pivot pin 63 projects laterally from each lever 61 intermediate the ends thereof, and slides in undercut portions of a radial groove 64a in the guide plate 24. The grooves 64a are located intermediate the slots 35.

The inner end of each lever 61 is deflected upwardly, as at 64, so as to be above the plane of the outer end, and so that the end 64 may be depressed to raise the associated slide 59. When pressure is released from the lever ends 64, the slides 59 will drop by gravity. The sides of the slides 59 project, when the slides 34 are in predetermined position with respect thereto, into the grooves 38, in the proximate sides of the slides 34, and will move out of such grooves when all slides are extended.

The ends 65 of the walls 60 of the slides 59 project into the wall 41 of the slides 34, through the open bottoms 44 thereof, and the size of the spaces in the walls 41 is sufficient to permit free action of the telescoping walls, and to prevent binding. The flanges 46 on the slides 34 are provided to cover the spaces between the side edges of the slides 34 and 59, when the edges of the slides 59 do not project into the grooves 38.

When the parts are in normal or operative position, and the table top 27 is lowered after the slides 34 and 59 are extended, the supporting member 28 will engage and depress the ends 64 of the levers 61, thereby bodily raising the slides 59 to the position shown in Fig. 11. The outer margin 27a of the table top is adapted to rest on the steps 39 of the slides 34. The margin of the plate 28 rests on the steps 40, and also on the top parts of the body portions of the slides 34 (Figs. 7 and 11).

Figures 5, 6, 7:
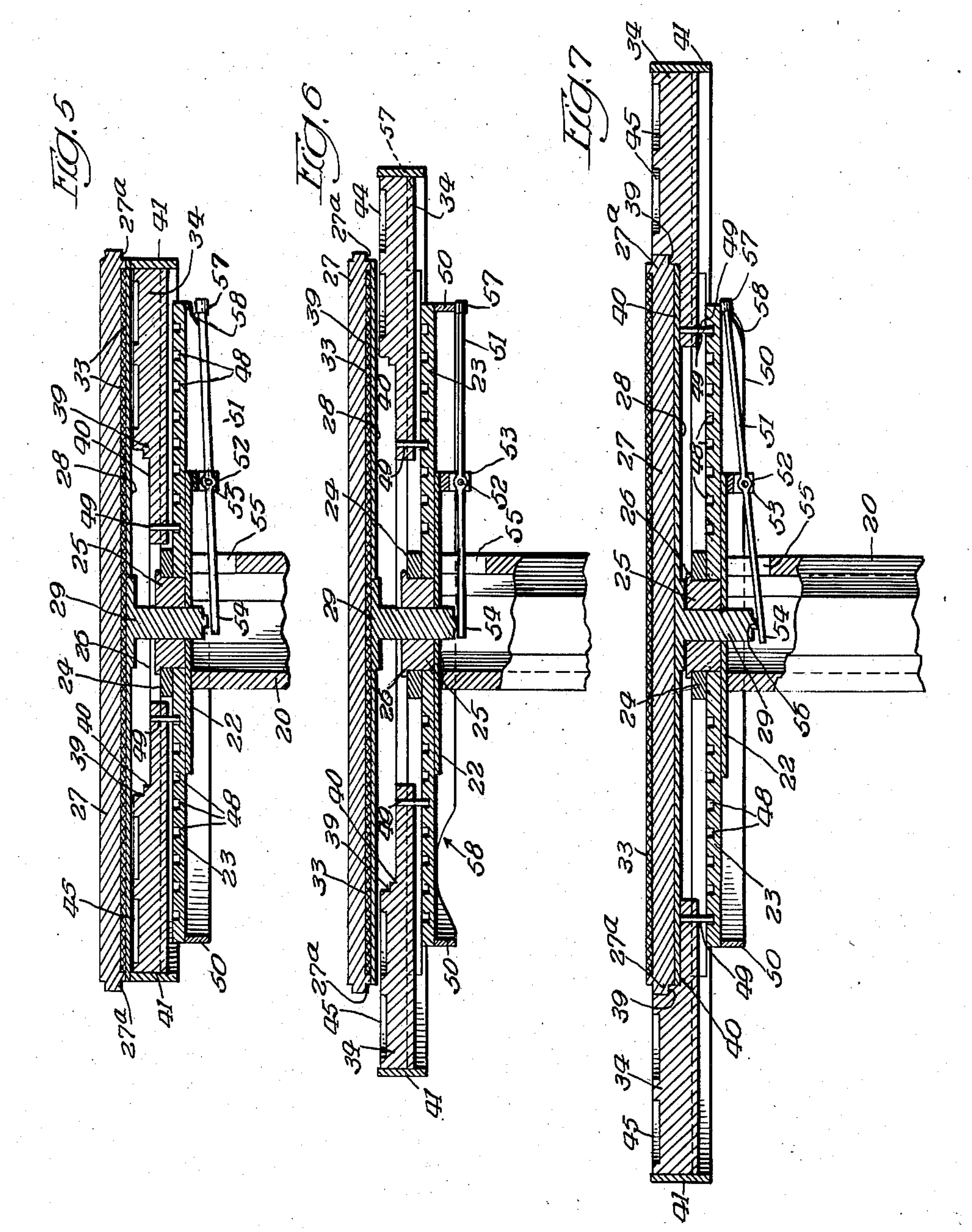
Fig. 5 is a sectional view on line 5—5, Fig. 8.
Fig. 6 is a view similar to Fig. 5, showing the table elevated so that it can be extended.
Fig. 7 is a sectional view on line 7—7, Fig. 9.
Figures 8, 9:
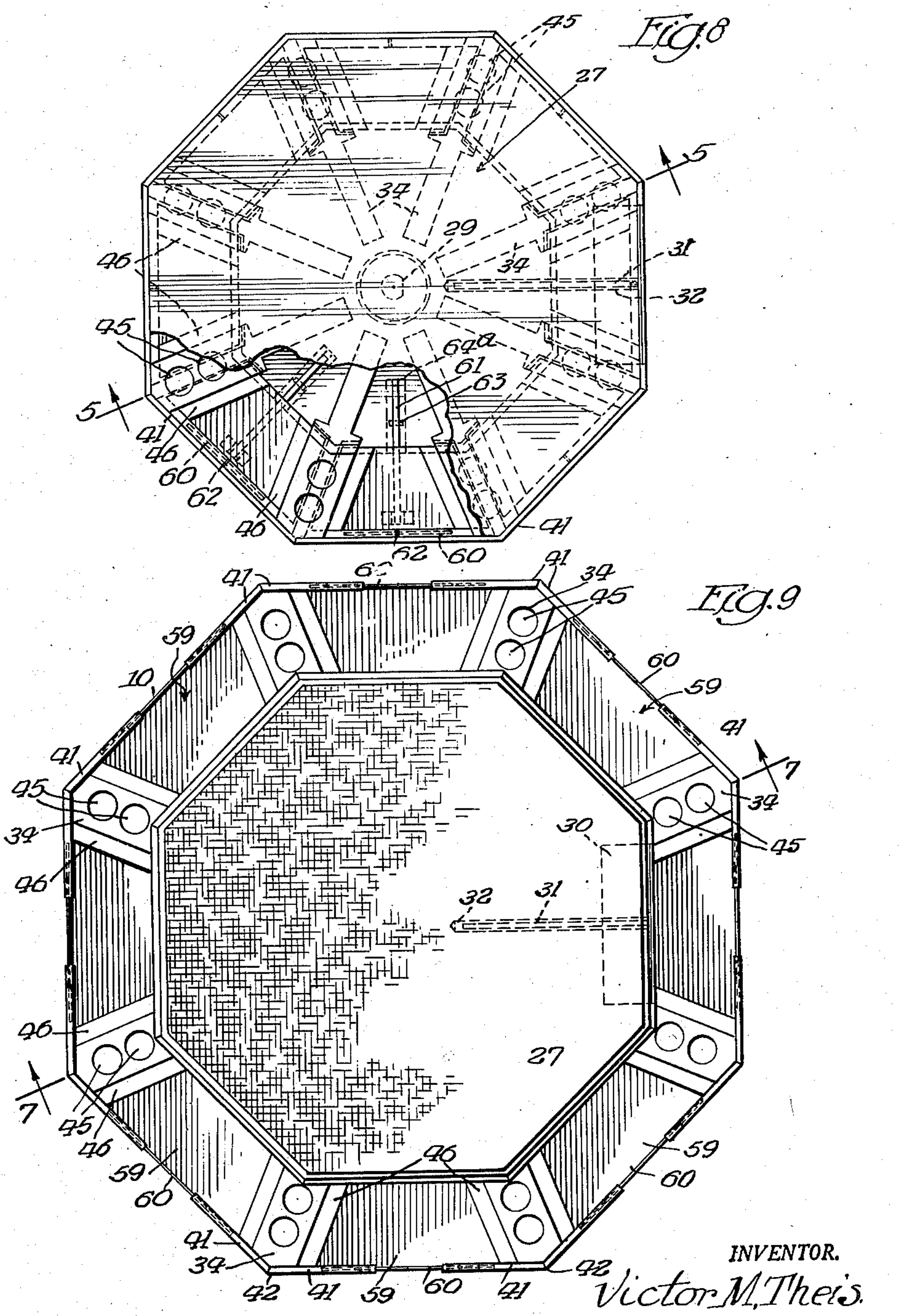
Fig. 8 is a top plan view of the table top, with parts broken away, and with the supports or slides in a collapsed or withdrawn position with respect to the top.
Fig. 9 is a top plan view of the table top, showing the slides or supports in extended position.

When the slides are retracted, the table top will rest upon the outer ends of the top parts of the slides 34, and also upon the walls 41 (Figs. 5 and 12). In their extended position, the tops of the outer end portions of the slides 34, which contain the recesses 45, are substantially flush with the upper face of the table top (Fig. 7), while the tops of the slides 59 are depressed or disposed in a lower plane, to form with the sides of the slides 34, compartments or open receptacles for receiving game pieces or other articles.

The sides of the slides 59 may be beveled, as at 65a, to co-operate with the beveled edges 47 of the flanges 46 on the slides 34. The slides 59 are moved outwardly and inwardly by the slides 34 by reason of the front walls 60 of the slides telescoping or fitting into the hollow walls 41 of the slides 34, the telescoping arrangement being loose enough to permit of the proper actuation and operation of such slides.

It is thought that the operation of this improved table will be clearly understood from the foregoing description, but, briefly stated, it is as follows:

Normally, the parts will be in the relative positions as shown in Fig. 5, with either face of the table top uppermost. In such positions the slides 34 and 59 are retracted, and the table top lowered so that the roller on the end of the lever 51 will be raised and resting in the recess 58 of the flange 50, on the actuating member 23. In this position, the table top 27 may be raised to swing upon the hinge 30, to the dotted line position shown in Fig. 2, and may then be turned or swiveled about the rod 31, to bring either of the faces of the top uppermost, after which it is lowered or moved back about the hinge to its normal or operative position. When it is to be converted from a serving table into a gaming table, the top is first bodily raised by means of the actuating member 23, which is rotated by grasping the flange 50 thereof.

This will cause the cam surface or wall of the recess 58 to depress the outer end of the lever 51, and thereby bodily raise the supporting member 28, and with it the table top, to the position shown in Fig. 6. After raising of the top 27, further rotation of the actuating member 23 will through the pins 49 and grooves 28, move the slides 34 outwardly and such slides will in turn shift out with them the slides 59. After the slides 34 have been fully extended, which will occur when the recess 58 in the flange 50 is in a position to receive the outer end of the lever 51, the table top will drop down into active position, so that the supporting member 28, and the table top, will rest upon the steps or seats 40, and upon the top of the adjacent portions of the slides 34. This will lock the slides 34 in operative position and against accidental withdrawal, which withdrawal cannot be accomplished until the table top is again raised to the position shown in Fig. 6, by rotation of the actuating member 23.

When the table top drops down or is lowered from this position, i. e., the position shown in Fig. 6 to the position shown in Fig. 7, the table top supporting member 28 will engage the ends 64 of the levers 61, and thereby raise the slides 59 to the position shown in Fig. 13, the edges of the slides 59 having previously moved out of the grooves 38 in the slides 34 by the projecting operation of the latter; that is, from the position shown in Fig. 14 to the position shown in Fig. 13.

By reason of the fact that the slides 34 are radially disposed with respect to the center of the table top, as are also the slides 59, the proximate faces of adjacent slides 34 will, during their outward movement, move away from each other, thereby increasing the space therebetween. When they are retracted, this space will decrease. In order to provide for this variation in the size of the space, the grooves 38 are provided in the walls of the slides 34.

When the slides are all retracted, the sides of the slides or supports 59 project into these grooves to permit of such operation (Fig. 14), and when the slides are extended or projected, the sides of the slides 59 will pass out of the grooves 38, as shown in Fig. 13, and the slides 59 will be bodily elevated so that the edges thereof will engage or co-operate with the flanges 46, to form a closure for the space between the proximate faces of the slides 34.

To retract the slides 34 and 59, the operation is reversed by rotating the actuating member in the opposite direction. Reverse rotation will first raise the table top to permit of the retraction of the slides 34, and the slides 59 therewith. At the same time, when the supporting member 28 moves out of contact with the ends 64 of the levers 61, the slides 59 will drop by gravity.

While the preferred form of the invention has been herein shown and described, it is to be understood that various changes may be made in the details of construction, and in the combination and arrangement of the several parts, within the scope of the claims, without departing from the spirit of this invention.

I claim:

1. An extensible table comprising a standard, a horizontal guide plate mounted on the upper end of the standard and provided with a plurality of radially extending, equidistantly spaced slots, block-like slides mounted in the slots to slide inwards and outwards, panel-like slides extending between the block-like slides, connected to the latter so as to slide inwards and outwards therewith, and adapted after being slid outwards with said block-like slides to form with the latter exposed open top receptacles, an actuating member positioned beneath the guide plate and mounted to move back and forth to a predetermined extent, connections between the block-like slides and the actuating member operative, after initial movement of the member in one direction and prior to complete movement of said member to said predetermined extent, to slide the block-like slides together with the panel-like slides conjointly outwards and also operative, after initial movement of the member in the opposite direction and prior to complete movement of the member to said predetermined extent, to shift said block-like slides together with said panel-like slides conjointly inwards, a top positioned over the guide plate, mounted to move up and down to a limited extent and adapted when the block-like and panel-like slides are slid inwards to overlie and cover said slides, and means between the actuating member and the top operative automatically to shift the top upwards during initial movement of the actuating member in either direction and to lower the top during completion of movement of said member in either direction.

2. An extensible table comprising a standard, a horizontal guide plate mounted on the upper end of the standard and provided with a plurality of radially extending equidistantly spaced slots, block-like slides mounted in the slots to slide inwards and outwards, panel-like slides extending between the block-like slides, connected to the latter so as to slide inwards and outwards therewith, and adapted after being slid outwards with said block-like slides to form with the latter exposed open top receptacles, a horizontally extending circular actuating member positioned beneath the guide plate and mounted on the upper end of the standard to rotate back and forth throughout a predetermined arc, connections between the block-like slides and the actuating member operative, after initial rotation of the member in one direction and prior to complete rotation of said member throughout said arc, to slide the block-like slides together with the panel-like slides conjointly inwards, and also operative, after initial rotation of the member in the opposite direction and prior to complete rotation of the member throughout said arc, to shift said block-like slides together over said panel-like slides inwards, a top positioned over the guide plate, mounted to move up and down to a limited extent, adapted when the block-like and panel-like slides are slid inwards to overlie and cover said slides, and provided on the central portion thereof with a depending stud, and means operative automatically to shift the top upwards during initial rotation of the actuating member in either direction and to lower the top during completion of rotation of said member in either direction and consisting of an annular flange connected to, and depending from, the margin of the actuating member and provided with a cam type recess therein, and a centrally fulcrumed lever mounted under and extending radially with respect to the actuating member and having the outer end in coacting relation with said flange and its inner end in operative relation with the lower end of said stud.

3. An extensible table comprising a standard, a horizontal guide plate mounted fixedly on the upper end of the standard and provided with a plurality of radially extending, equidistantly spaced slots, block-like slides mounted in the slots to slide inwards and outwards, panel-like slides extending between the block-like slides, connected to the latter so as to slide inwards and outwards therewith, and adapted after being slid outwards with said block-like slides to form with the latter exposed open top receptacles, a horizontally extending circular actuating member positioned directly beneath the guide plate and mounted on the upper end of the standard to rotate back and forth throughout a predetermined arc, connections operative, after initial rotation of the member in one direction and prior to complete rotation of said member throughout said arc, to slide said block-like slides together with the panel-like slides conjointly outwards, and also operative, after initial rotation of the member in the opposite direction and prior to complete rotation of the member throughout said arc, to shift said block-like slides together with said panel-like slides conjointly inwards, and consisting of spiral grooves in the upper face of said actuating member and vertically extending pins connected to, and extending downwards from, the slides and fitting in the grooves respectively, a top positioned over the guide plate, mounted to move up and down to a limited extent, adapted when the block-like and panel-like slides are slid inwards to overlie and cover said slides, and provided at the central portion thereof with a depending stud, and means operative automatically to shift the top upwards during initial rotation of the actuating member in either direction and to lower the top during completion of rotation of said member in either direction and consisting of an annular flange connected to, and depending from, the margin of the actuating member and provided with a cam type recess, and a centrally fulcrumed lever mounted beneath, and extending radially with respect to, the actuating member and having the outer end in coacting relation with said flange and its inner end in operative relation with the lower end of said stud.

4. An extensible table comprising a standard, a horizontal guide plate mounted on the upper end of the standard, an annular series of equidistantly spaced block-like slides mounted on the guide plate to slide radially inwards and outwards, panel-like slides extending between the block-like slides, connected to the latter so as to slide inwards and outwards therewith, mounted to move upwards and downwards with respect to said block-like slides after the last mentioned slides are moved outwards, and adapted when shifted upwards after outward sliding of the block-like slides to form with the latter exposed open top receptacles, a horizontal actuating member positioned beneath the guide plate and mounted to rotate back and forth through a predetermined arc, connections between the block-like slides and the actuating member operative, after initial rotation of the member in one direction and prior to complete rotation of said member throughout said arc, conjointly to slide said block-like slides together with the panel-like slides outwards and also operative, after initial rotation of the member in the opposite direction and prior to complete rotation of the member throughout said arc, conjointly to shift said block-like slides together with said panel-like slides inwards, a top positioned over the guide plate, mounted to move up and down to a limited extent, and adapted when the block-like and panel-like slides are slid inwards to overlie and cover said slides, means between the actuating member and the top operative automatically to shift the top upwards during initial rotation of the actuating member in either direction and to lower the top during completion of rotation of the member in either direction, and means whereby the panel-like slides are automatically shifted upwards in response to lowering of said top after outward sliding of the slides.

VICTOR M. THEIS.

REFERENCES CITED

The following references are of record in the file of this patent:

UNITED STATES PATENTS

| Number | Name | Date |
|---|---|---|
| 522,014 | Hunzinger | June 26, 1894 |
| 821,955 | Nash | May 29, 1906 |
| 993,539 | Munz | May 30, 1911 |
| 1,128,808 | Manoogian | Feb. 16, 1915 |
| 1,158,125 | Fink | Oct. 26, 1915 |
| 1,384,925 | Seiler | July 19, 1921 |

FOREIGN PATENTS

| Number | Country | Date |
|---|---|---|
| 6,788 | Great Britain | 1835 |
| 849,989 | France | Dec. 5, 1939 |